June 3, 1952 T. L. DIRKSEN 2,599,096
PORTABLE WORKBENCH FOR POWER-DRIVEN HAND AND TABLE TOOLS
Filed July 7, 1950 8 Sheets-Sheet 1
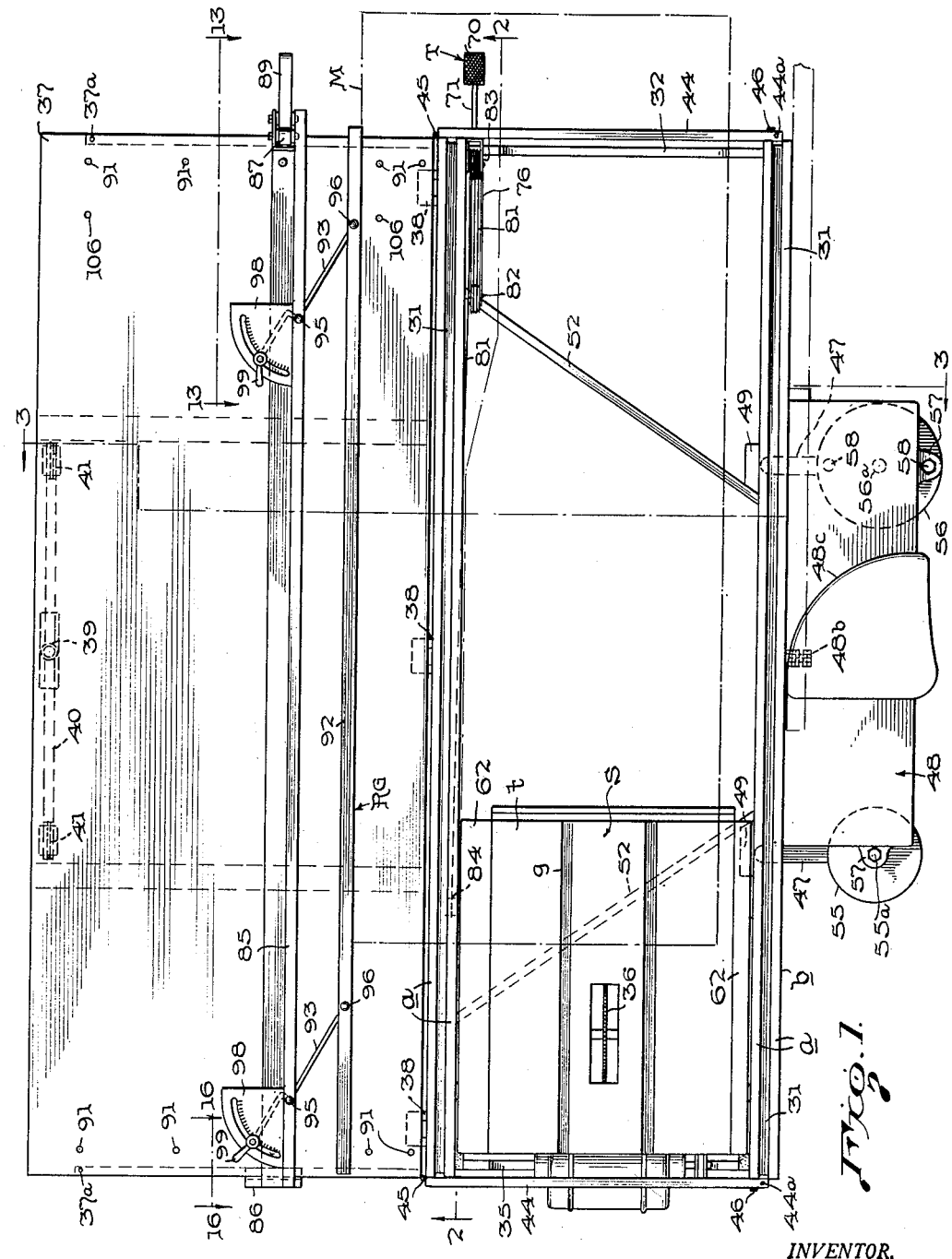
INVENTOR.
THEODORE L. DIRKSEN
BY
his ATTORNEY

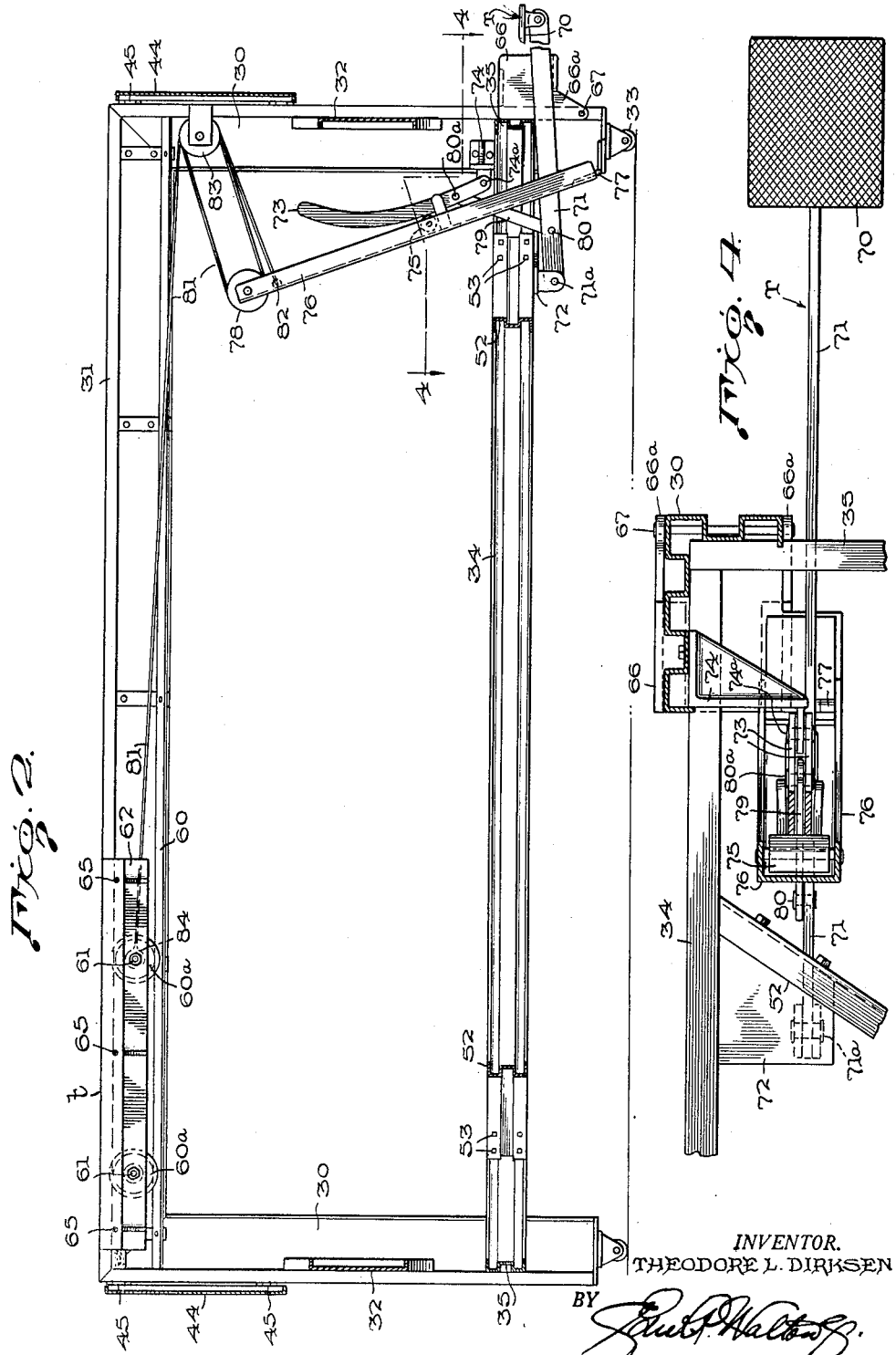

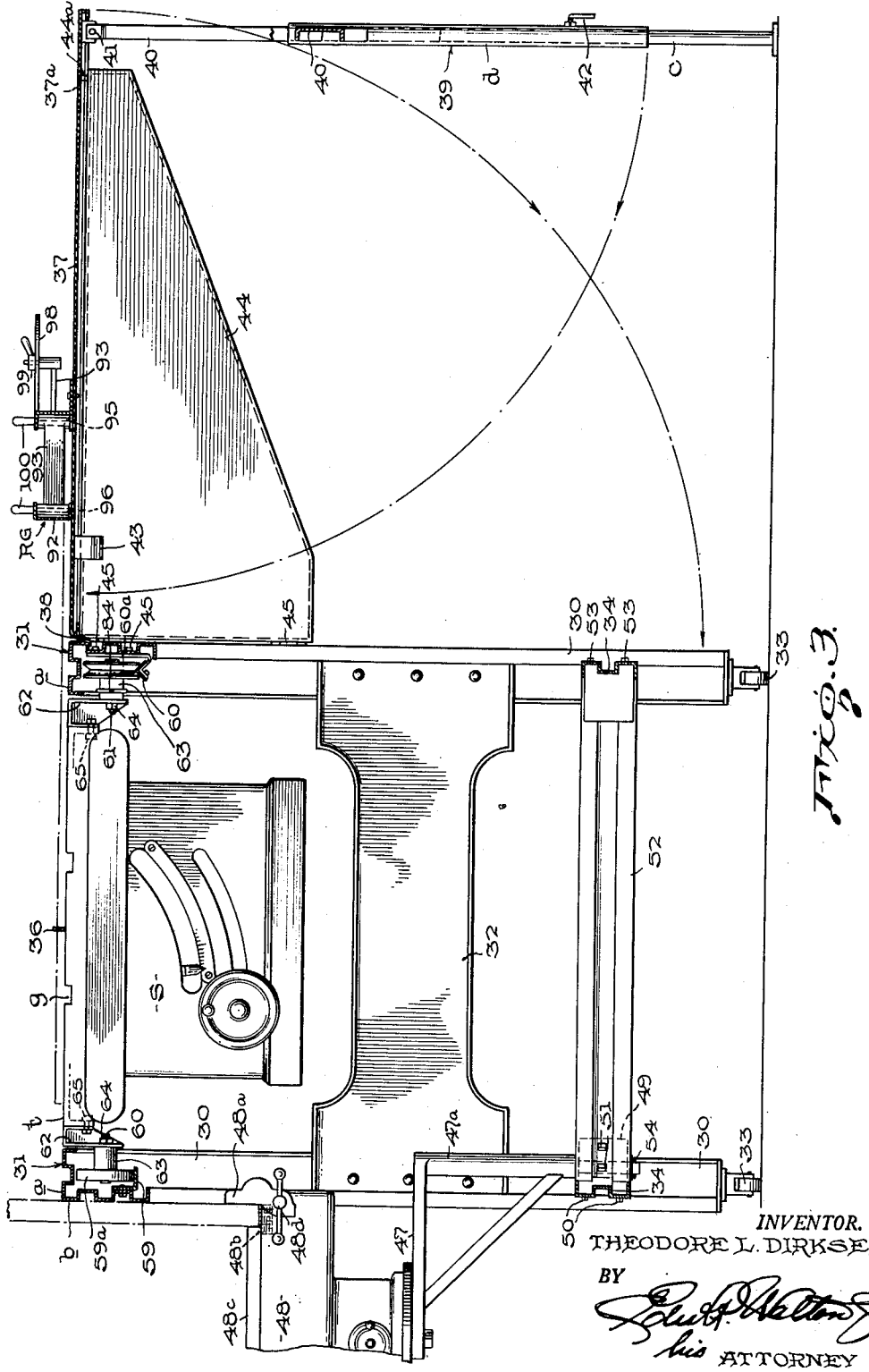

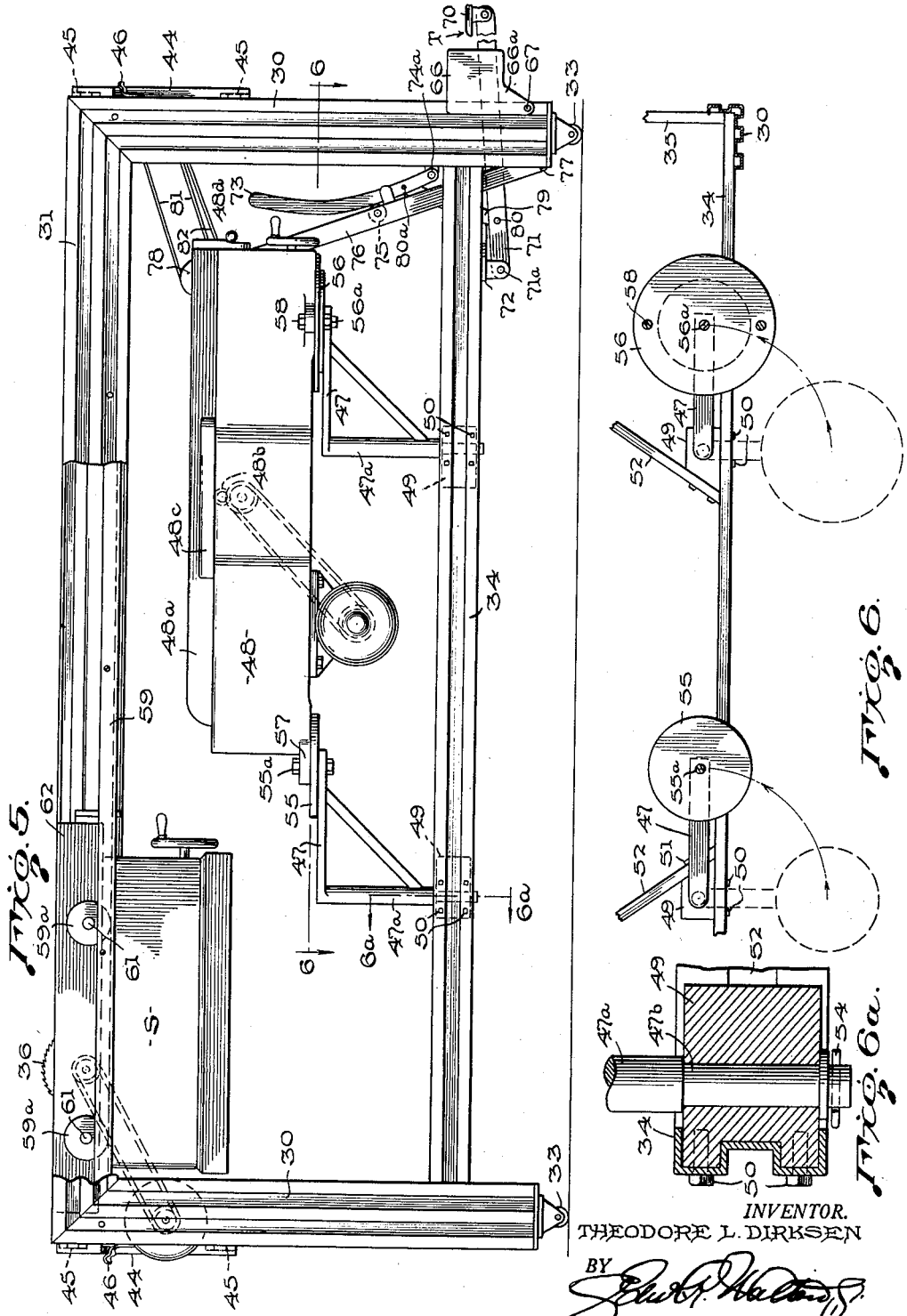

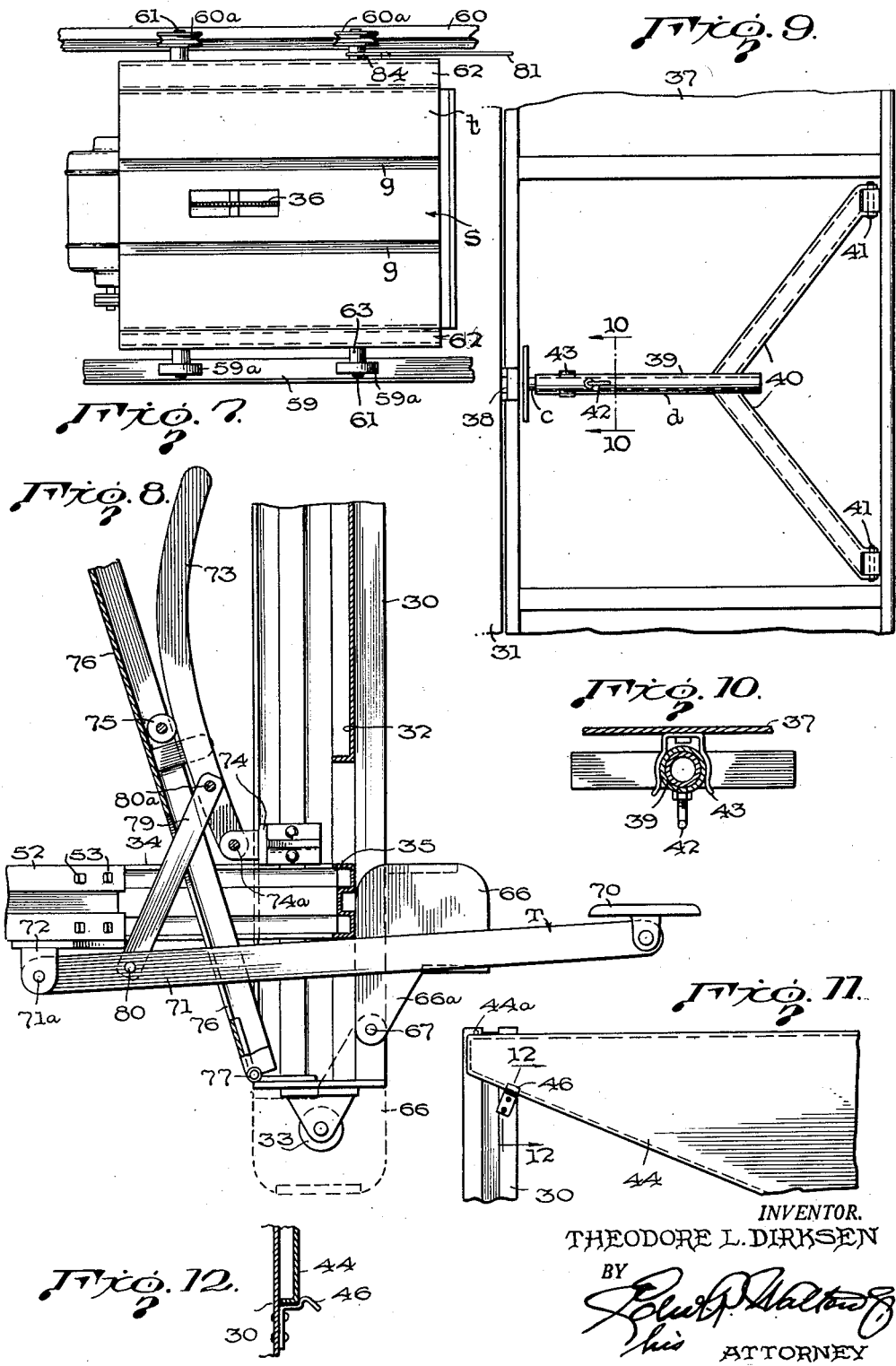

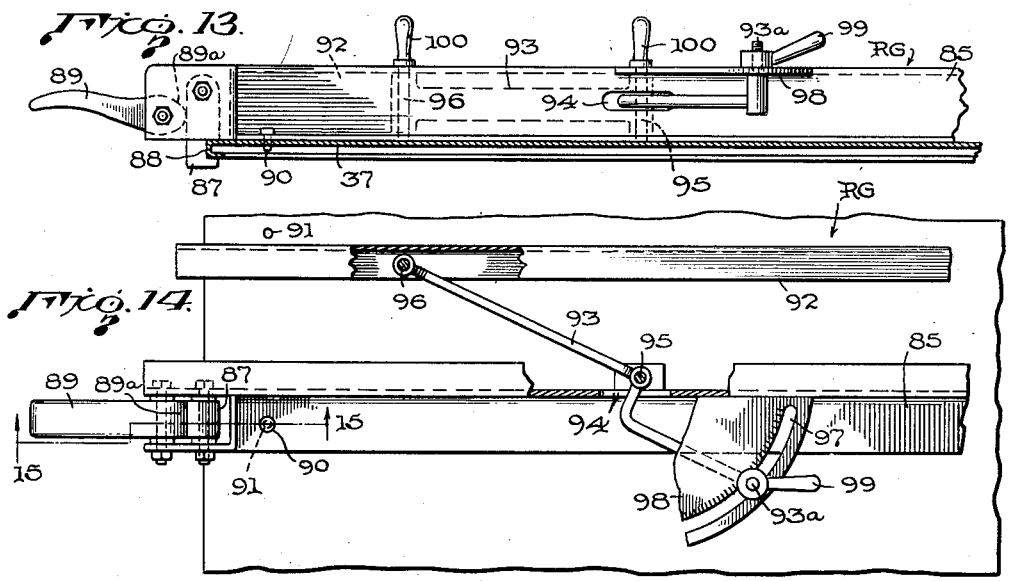
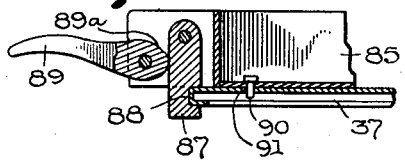
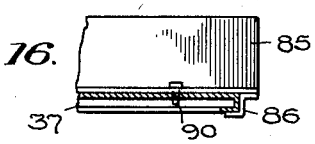
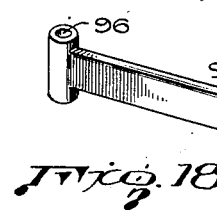
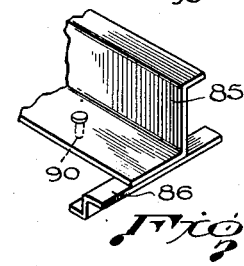
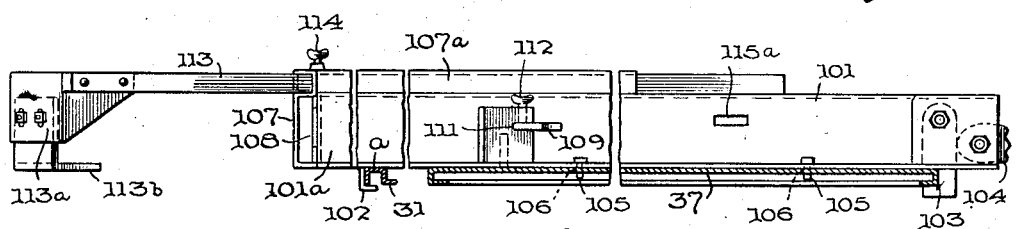
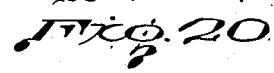
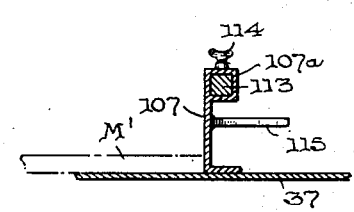

June 3, 1952      T. L. DIRKSEN      2,599,096
PORTABLE WORKBENCH FOR POWER-DRIVEN HAND AND TABLE TOOLS
Filed July 7, 1950      8 Sheets-Sheet 7
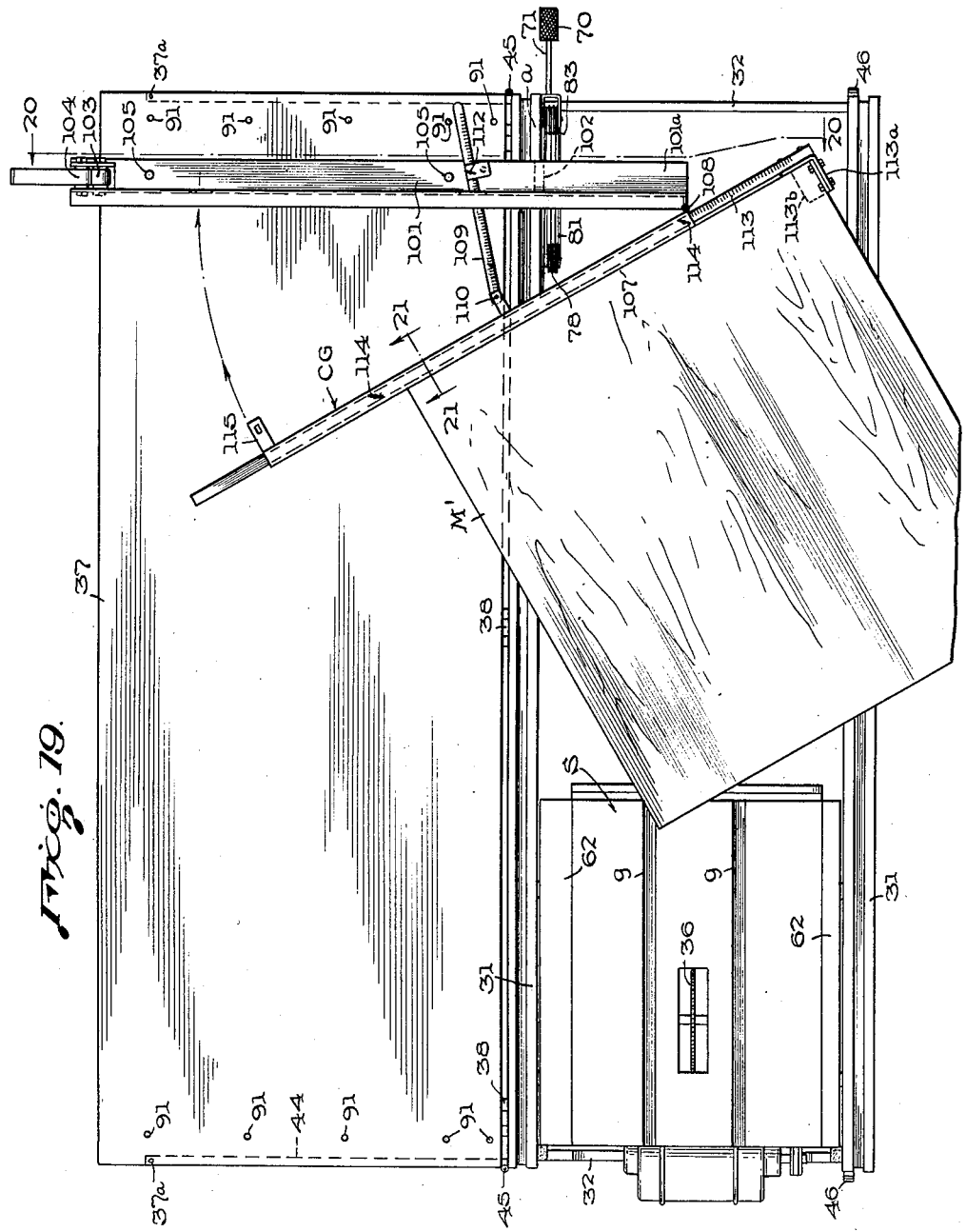
INVENTOR.
THEODORE L. DIRKSEN
BY
his ATTORNEY June 3, 1952           T. L. DIRKSEN           2,599,096
PORTABLE WORKBENCH FOR POWER-DRIVEN HAND AND TABLE TOOLS
Filed July 7, 1950           8 Sheets-Sheet 8
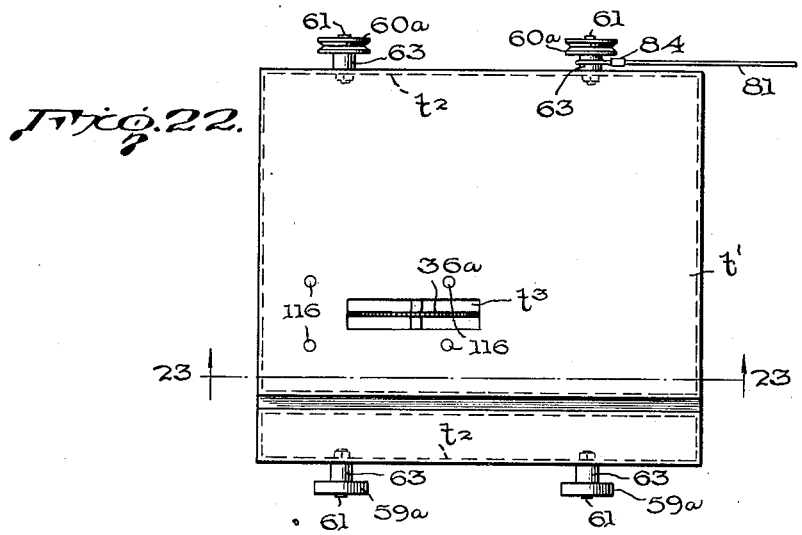
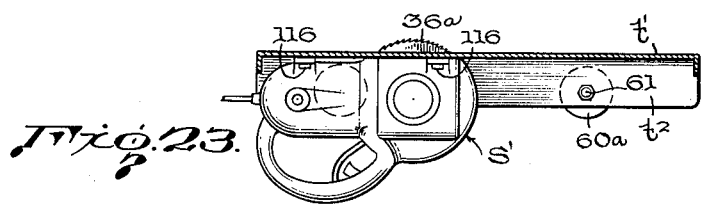
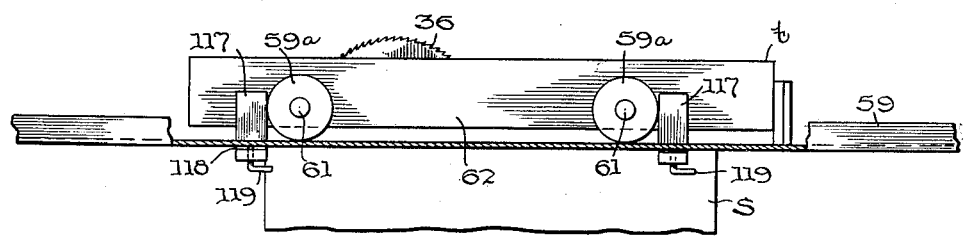
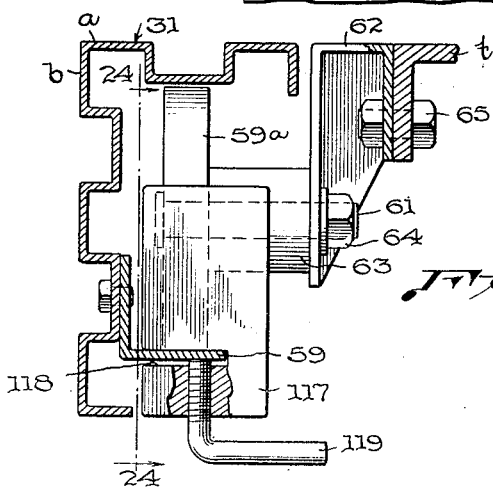
INVENTOR.
THEODORE L. DIRKSEN
BY
*his* ATTORNEY Patented June 3, 1952

2,599,096

UNITED STATES PATENT OFFICE 2,599,096

PORTABLE WORKBENCH FOR POWER-DRIVEN HAND AND TABLE TOOLS

Theodore L. Dirksen, La Belle, Mo., assignor to Fred L. Spicknall, La Belle, Mo.

Application July 7, 1950, Serial No. 172,512

4 Claims. (Cl. 144—286)

The present invention relates to improvements in portable benches in which power-driven hand or table tools such as saws, jointers, drills, routers and the like may be movably mounted and supported to provide a small unitary mill for use by carpenters on building construction and by home users, particularly with doors and materials of large dimensions.

In the past decade or two there have been developed a number of portable automatic tools such as saws, jointers, drills and the like of the type suitable for hand use, small work shops and by carpenters or metal workers in the construction of houses, furniture and the like, as distinguished from machine-tools and woodworking tools of the type employed in factories and mills or otherwise of a non-portable character.

The present invention deals with the use of the first type of tools mentioned which vary from the small size portable power driven hand tools to a larger type known as "table tools" that comprise a base supporting a stationary rotatable tool, actuating means for the tool and a stationary table associated with the tool and upon which table the work-piece may rest while being operated upon by the tool. In table tools, the bases are usually portable in that they may be moved about from place to place with reasonable facility but, when in use, may rest upon a support. Such tools are popular among journeymen artisans as well as among householders or small artisan shops. In the use of these tools, the user is limited to materials of relatively small dimensions upon which the tool will accurately perform its work; and, in most instances where the materials are of relatively large dimensions, in width or length or both, that can be worked with such tools, one or two assistants are required to hold and guide the material. Thus, for instance, in the use of a table saw by a carpenter to rip or cross-cut or to produce an angular cut in a sheet of plywood, whose dimensions ordinarily are 4 feet wide by 8 feet long, the carpenter is placed at a great disadvantage in the use of the ordinary table or hand saw and cannot perform the work without the aid of one or two assistants with any assurance that the work will be accurately or properly performed.

Furthermore, it is known that the prior art has proposed saw tables upon which is reciprocally mounted a rotating saw but, so far as is known, these are designed as special unitary machines and not applicable for use with stock hand or table tools commonly found on the market.

It is an object of the present invention to provide a novel and improved guide bench to which one or more of the, now commonly popular, power-driven hand or table tools of different sizes or makes may be detachably adapted and employed to provide a small sized mill which will enable a single workman or operator to handle to advantage materials of large dimensions (i. e. 4' x 8' or larger) to rip, to cross-cut, to angularly cut, to bevel, to drill, to plane, to gouge or groove accurately and with facility and without the aid of other assistants.

A more specific object of the invention is the provision of an improved portable guide-bench to which stock type hand and table saws of different sizes or makes may be quickly attached and detached and which has actuating mechanism that will traverse the saw the length of the table from a very small movement of a foot pedal, under full control of the operator, for performing work on work-pieces of exceedingly large dimensions thus leaving the operator's hands free for such functions as may be required or necessary while the work-piece is being fully supported by the bench.

Another object of the invention is to provide such a guide-bench, as just defined, which will also conveniently support a jointer that may be moved into and out of operative position and, when in operative position, the bench forms a back-stop or guide for the work being operated upon by the jointer and, when in inoperative position is stowed-away within the confines of the bench.

A still further object of the invention is a guide-bench, of the character just mentioned, wherein automatic drills may be used to advantage with a movable saw slide.

In addition to the objects above mentioned, there are other objects and features of the invention which will appear as this specification proceeds and which reside in the sundry details of construction and combination and arrangement of parts which will be described in detail and pointed out in the appended claims.

In the drawings which show the embodiment of the invention as presently devised, and which drawings, by reference, form part of this specification—

Figure 1 is a top plan view of the portable guide-bench with the saw-table of a power-driven saw and with a jointer movably mounted thereon in accordance with the present invention, the jointer being shown in its operative position;

Figure 2 is a longitudinal sectional view taken substantially on line 2—2 of Fig. 1;

Figure 3 is a transverse sectional view taken substantially on line 3—3 of Fig. 1;

Figure 4 is a sectional view taken substantially on line 4—4 of Fig. 2 and looking down upon actuating mechanism that traverses the saw and its table;

Figure 5 is an elevation of the side of the guide-bench upon which a jointer is mounted to be moved into and out of operative position with the bench, said jointer being shown therein in its stored or inoperative position within the confines of said guide-bench;

Figure 6 is a top plan view of the jointer supporting means carried by said guide-bench and is taken substantially on line 6—6 of Fig. 5;

Figure 6a is a detail sectional view of mounting for the jointer supporting means and taken substantially on line 6a—6a of Fig. 5;

Figure 7 is a plan view of the saw table per se as shown in Fig. 1 and of the manner of mounting the same on supporting tracks for reciprocal movement;

Figure 8 is an enlarged detail side view of the saw-table actuating mechanism shown in Figures 1, 2 and 5;

Figure 9 is a fragmental underside view of the work supporting drop-leaf hinged to one side edge of said bench and illustrating the supporting leg therefor and the manner of collapsing and holding it against the underside of said drop-leaf;

Figure 10 is a detail view taken substantially on line 10—10 of Fig. 9 and showing the clip employed to hold the supporting leg against said drop-leaf;

Figure 11 is a fragmentary elevation of one of the hinged end wings of the guide bench and the manner of holding it in place when swung to its opposite position from that shown in Fig. 3;

Figure 12 is a detail sectional view taken substantially on line 12—12 of Fig. 11;

Figure 13 is an enlarged side elevation of one end portion of the ripping-gauge, shown in Figs. 1 and 3, mounted on the dropleaf and is taken substantially on line 13—13 of Fig. 1;

Figure 14 is a top plan of said end portion of the ripping-gauge shown in Fig. 13;

Figure 15 is a detail section view illustrating the construction of the releasable clamp on one end of said ripping-gauge holding bar and is taken substantially on line 15—15 of Fig. 14;

Figure 16 is a view similar to Fig. 15 and taken substantially on line 16—16 of Fig. 1 to show the construction of the other end of said ripping-gauge holding bar;

Figure 17 is a perspective view of the end of the ripping-gauge holding bar shown in Fig. 16;

Figure 18 is a perspective view of the adjustable support for the ripping-gauge;

Figure 19 is a plan view of the guide-bench having the crosscut gauge of this invention applied thereto and which is adjustable for taking cross oblique or angular cuts on the workpiece with a traveling rotating saw;

Figure 20 is a side elevation of said cross-cut gauge taken on line 20—20 of Fig. 19;

Figure 21 is a detail section taken substantially on line 21—21 of Fig. 19;

Figure 22 is a top plan view of the traveling saw table to be reciprocally mounted on the guide bench and to have a power driven hand or hand saw detachably connected thereto;

Figure 23 is a sectional view taken substantially on line 23—23 of Fig. 22;

Figure 24 is a side elevation of the saw and its table mounted on the supporting rails of the guide bench, as shown in Fig. 7, but with parts broken away to show the chocking-blocks employed to hold the saw-table stationary on said bench, when desired, for doing certain cutting while the saw is held stationary, and is taken substantially on line 24—24 of Fig. 25; and Figure 25 is a detail sectional view taken transversely through the upper left-hand corner of the guide bench shown in Fig. 3 but with the chocking-blocks, shown in Fig. 24, applied.

Throughout the specification and the drawings like characters of reference denote similar like parts.

More specifically, the bench of the present invention is of rectangular construction comprising four corner standards or legs 30, each pair of legs on opposite sides of the bench being connected at their upper ends by top side rails 31 and each pair of legs 30 at the respective ends of the bench being connected intermediate their length by end plates 32 to hold the side portions of the bench rigidly in spaced relation. The bottom ends of the legs 30 are equipped with casters 33 so that the bench may be easily and readily moved from place to place as may be required or desirable. The bench, now constructed in accordance with the present invention, has its side rails 31 seven feet long and is about thirty-six inches high from the supporting surface upon which the casters 33 rest. The overall width of the bench is thirty inches, in its collapsed position—i. e. with the side drop-leaf down and with the jointer disposed within the confines of the bench as presently will be explained—thus enabling the bench to be moved through doorways, halls, aisles of stores and the like. In order to give rigidity to the bench as well as support to other instrumentalities of the bench, as will presently appear, lower side brace rails 34 connect opposite legs on opposite sides, respectively, of the bench at a point spaced from the bottom ends of the legs 30 and which are complemented by lower end brace rails 35 connecting opposite legs 30 at opposite ends of the bench and as a continuation of the side brace rails 34.

While the bench may be constructed of any suitable material, it is preferred that the legs 30 and rails 31 be constructed of light weight metals, such as sheet steel or sheet aluminum strips which are corrugated to add strength and rigidity and which in cross-section are formed right angles, as shown. The lower brace rails 34 and 35 are made of similar material but are straight corrugated pieces as indicated in the drawings. The upper surfaces a of the rails 31 are arranged in alignment—that is, in the same horizontal plane—so as to provide a level surface upon which to support material to be operated upon by the saw 36 or other suitable rotating tool.

With the right end of the bench, as shown in Figures 1, 2, 3, 5 and 19, regarded as the front end which the operator faces while operating the tool 36, the bench is provided on its right hand side, as shown more particularly in Figure 3, with a drop-leaf 37 extending the length of the bench and hinged at one of its longitudinal edges, as at 38, to the longitudinal edge portion of the right upper side rail 31 so that when said dropleaf is in its extended or horizontal position (as shown in Fig. 3) its top surface is in the same horizontal plane with the top surfaces a of the top side rails 31. The drop-leaf is supported in its horizontal position by an adjustable leg 39 carried by a V-shaped bracket 40 hinged at its ends to the distal end of the drop-leaf, as at 41. The leg 39 comprises two telescoping pieces c and d that may be longitudinally adjusted and held in adjusted position by a set screw or clamp 42. The leg 39 may be swung on the pivots 41 inwardly and upwardly against the underside of the drop-leaf 37 where it will engage a spring clip 43 and be retained in substantially parallel position against the underside of the drop-leaf, thus allowing the drop-leaf to assume a position against and substantially parallel with the right side of the bench, unless the drop-leaf is being otherwise supported by a wing 44 at each end of the table, said wings being hingedly connected as at 45 to an adjacent leg 30 of the bench. The wings 44 serve two purposes: that of supporting the ends of the drop-leaf 37, as shown in Fig. 3, when said additional support is needed and that of giving support to material being operated upon by the tool 36 when the wings at the front and rear ends of the bench are swung across said ends of the bench as in Figs. 1, 2 and 5. The hinges 45 are such as allow the wings 44 to move 180°—that is to say to allow the wings to be swung from their position shown in Figs. 1, 2 and 5 athwart the space between the ends of the top rails 31 to assume the position shown in Fig. 3. The wings 44 are releasably held in their positions shown in Figs. 1, 2 and 5 by spring clips 46 shown in detail in Figs. 11 and 12 and are held in their positions shown in Fig. 3 by upwardly projecting pins 44a carried on their upper edges and which extend into openings or holes 37a underside of the end edge portions of said wings 44.

In many operations employing the tool 36, the drop leaf 37 will not be necessary but, in its horizontal position, it forms a very convenient support for wide or long pieces of material, affords a surface upon which a rip-gauge may be mounted in several adjusted positions and otherwise provides a very handy and convenient bench surface useful for many other purposes and which may be collapsed within the narrow confines of the bench proper for easy mobility of the latter.

On the other side of the bench, there are mounted on the lower side brace rail 34 two horizontally swingable brackets 47 spaced apart sufficiently to have mounted thereon the opposite end portions of a jointer 48, the brackets 47 having a vertical spindle 47a whose lower end is reduced at 47b and is journalled in a bearing block 49 bolted to the inside surface of the lower side brace rail 34 by bolts 50; and which blocks 49 are also bolted, as at 51, to diagonal brace struts 52 extending from one lower side brace rail 34 on one side of the bench to the opposite brace rail 34 where they are bolted by bolts 53. The arbor or spindle portions 47b of the brackets 47 may be lifted out of the blocks 49 by removal of a retaining pin or nut 54 from the extremities of said arbors that extend through the blocks. Pivotally mounted on each end of the bracket arms 47 are horizontally disposed discs or platforms 55 and 56, respectively, upon which the opposite end portions of a jointer 48 rest.

The jointers now on the market are usually provided on their base with outwardly extending lugs or ears 57 at spaced points along their end and side edges so as to be bolted or otherwise fastened to a supporting surface. These ears or lugs are made use of in applying the jointer 48 to the brackets 47. An ear 57 on one end of the jointer has the pivot 55a of the disc 55 extending through the opening therein and the upper end of this spindle may be threaded or otherwise formed tot receive a retaining nut or cotter-pin so that the jointer will swing relative to the bracket about the spindle 55a of disc 55. However, the other end portion of the jointer 48 has a side ear 57 secured to the disc 56 at points off-center with respect to its pivot or spindle 56a so that the jointer is fastly connected to the disc 56. Thus the bracket arms 47 may be swung to a stowed or inoperative position indicated in full lines in Figures 5 and 6 carrying the jointer with it so that the jointer will lie wholly within the confines of the bench and some distance below the top side rails 31; or the bracket arms 47 may be swung outwardly to operative position as shown in full lines in Figures 1 and 3 and dotted line positions in Fig. 6. Because of this manner of mounting the jointer 48 on the discs or platforms 55 and 56, it will remain in its stowed or operative positions against free movement except when deliberately moved with considerable force.

When the jointer is in its operative position shown in Figs. 1 and 3—because of the position of the supporting discs 55 and 56 on the brackets 47—the jointer is substantially parallel to the bench so that its back-guard 48a will be in vertical alignment with the outer surface b of the over-lying upper side rail 31 which provides a back-stop cooperating with the back-guard 48a of the jointer in order that a door, window sash or other materials, of large dimensional width to be planed, grooved or otherwise operated upon by the rotating tool 48b of the jointer, may be held and guided by one operator, without the assistance of helpers, to produce an accurate and proper operation upon the work-piece. It is understood, of course, that the front guard 48c can be adjusted to accommodate materials of different widths by the manipulation of suitable adjustments, such as 48d, usually provided on the jointer.

The work bench of this invention also is adapted to have mounted thereon for reciprocation to-and-fro of its length the well-known power-driven table saw S or the well-known power-driven hand saw S', both of which are commercial products now on the market and which is to be disposed between the upper side rails 31. The saw 36 or 36a may be interchangeable with other types of rotating tools, such as groovers or the like, by the simple expedient of removing the saw from its arbor and replacing it with another type of rotating tool as is contemplated with commercial power saws.

The adaptation of the power table-saw S to the bench of this invention is accomplished by providing tracks 59 and 60 mounted on the inner face of said upper side rails 31 and extending the length of said rails at a distance below the upper overhanging surfaces a of said rails. The track 59 mounted on the left hand rail 31 is, preferably, a right angle strip having one arm secured to the rail 31 and its other arm extending laterally and inwardly to provide a relatively wide flat track surface, while the track 60, mounted on the right hand rail 31, is similarly formed except that its track surface is an inverted V in shape. There are at least two rollers 59a, having flat rimmed treads, provided for tractional support by the track 59; and, at least, two rollers 60a, having V-shaped treads (complemental with the V-shape track 60) provided for tractional support by the track 60 as shown more particularly in Figs. 2, 3, 5 and 7. Each of these rollers 59a and 60a are mounted on a headed stub axle 61, the axles of rollers 59a extending through one leg of an elongated inverted U-shaped bracket 62 and the axles of rollers 60a being similarly carried by another bracket 62. There is interposed between the bracket and the roller a spacer sleeve 63 and the assembly is held together by a nut 64 threaded on the other end of the axle 61.

These roller-bracket assemblies are attached respectively to opposite sides of the table portion of a power-driven table saw S so that said saw may be bodily suspended by said rollerbracket assemblies from said tracks 59 and 60 (see Fig. 3) with the table top t of said power-saw flush or in the same plane with the top surfaces a of the upper side rails 31. This is accomplished by securing the other leg of the brackets 62 to a side edge of the table top t of the power saw S by any suitable detachable means, such as bolts 65. With the roller bracket assemblies so attached to the power table saw S as above described, it may be inserted through the front end of the bench upon the tracks 59 and 60 when the wing 44 is in the position shown in Fig. 3.

The power table saws of different makes vary slightly in dimensions and to compensate for this variation, spacer sleeves 63 of different lengths are provided with the bench, there being shown herein a power saw whose table top is of the widest dimensions. The closed or upper ends of the bracket 62 are to be flush with the upper surfaces a of the side rails 31 and should not extend above the same.

With the power saw S so installed in the work bench, it will be obvious that the same may be reciprocated back and forth along the entire length of the bench and that the V-shaped track 60 will maintain the tool 36 of the table saw in a straight line in its movement so as to produce accurate cutting operations upon work resting upon the bench while the flat tread rollers 59 offer less friction in the movement of the saw and permit lateral movement as when a spacer 63 of a different length is required between the bracket element 62 and the wheel 59.

The table power saw S moves by gravity from the front end of the bench to its rear end (i. e. from right to left in Figs. 1, 2, 5 and 19); and, to this end, the two front end legs 30 of the bench are equipped at their lower portions with means for raising the front end of the bench sufficiently to decline the bench from front end to back end (as shown particularly in Figs. 2, 5 and 8). This raising means may consist of a channel shaped member 66 having extensions 66a at two corners thereof that lie on opposite sides of the front surfaces of the front end legs 30 and are pivoted thereto by a pivot pin 67 which extends through said extensions and said legs, the pivot pin being so positioned that, when the member 66 is swung downwardly, it underlies the lower end of its respective leg with the end of said leg resting thereupon, thus forming a continuation of the leg and raising the same to a desired height that will give the top of the bench the declination necessary for the reciprocation power table saw to gravitate to the rear end of the bench. Of course, it is understood that, when the leg extension members 66 are moved to its dotted line position (as shown in Fig. 8), the front end of the table must be manually lifted so that said extension member may be moved in position.

The power table saw S is moved for effective cutting operations from the rear end of the bench to the front end of the bench, under the control of the operator, through means of a novel treadle mechanism T. The arrangement of this treadle mechanism is such that a relatively small depressed and downward movement of the treadle 70 will traverse the saw S the length of the bench. This treadle mechanism T is more particularly disclosed in Figs. 1, 2, 4, 5 and 8 and is shown as located adjacent the right front leg 30 of the bench to be accessible to the right foot of the operator and to apply its full force on the traveling power tool S at a point adjacent the V-shaped track 60 which guides the tool in its cutting movements.

The treadle mechanism T comprises a generally horizontally disposed treadle lever 71 pivoted at one end, as at 71a, to a plate support 72 secured to the lower side brace rail 34 and the adjacent brace strut 52. The other end of the lever 71 extends forwardly beyond the front end of the bench for a desired distance so as to be accessible to the foot of the operator and carries thereon the treadle pedal 70. Above the treadlelever 71 is disposed an arcuate throw-lever 73 pivoted at its lower end for a swinging movement in a vertical plane to a bracket 74 fastened on the adjacent leg 30. The convex surface of the throw lever 73 is positioned to ride upon a roller 75 journalled midway of the length of a pull-lever 76 also disposed for a swinging movement in a vertical plane and whose lower end is pivotally connected to the lower end of the adjacent leg 30, as at 77, and also whose upper end carries a double sheave 78. The treadle lever 71 is connected with a throw-lever 73 by a link 79, the link being pivotally connected to the treadle-lever at a point intermediate the center of the treadle-lever and its pivot 71a, as at 80, and having its other end connected to the throw-lever 73 at a point between the latter's pivot point 74a and its contact with the roller 75 on the pull-lever 76. As particularly shown in Fig. 4 it will be noted that the throw-lever 73 may comprise two slightly spaced identical levers arranged co-extensively and pivoted at 74a and that the link 79 extends through a slot in the pull-lever 76 (which is channel-shaped) and projects between the two spaced throw-levers 73 where it is pivoted to the same on pivot 80a. It has been found that this lever arrangement, through a simple cable connection, enables a downward movement of three inches of the treadle pedal 70 to impart movement to the pull-lever 76 that will cause the table t of the power tool device S to travel between 56 and 60 inches.

The cable connection between the pull-lever and the power saw S comprises a cable 81 having one end connected at 82 to the pull-lever 76 and passing over a three-way sheave 83, fast to the adjacent leg 30, and over the two-way sheave 78, the other end 84 of the cable 81 being detachably connected, as at 84, to the spacer 63 surrounding the axle 61 of the front rollerbracket assembly on the track 60.

It is manifest that by gradually depressing the treadle 70 the power table saw S may be moved from its rearmost position toward the front end of the bench so that the tool or saw 36 may operate upon the work by moving into the work rather than by having the work moved into the saw, as is customary in table saws of the character above described. By moving the saw or tool 36 into the work a much smoother cut is obtained.

For ripping long narrow pieces of material, the front end wing 44 may be closed across the end of the bench, as shown in Fig. 1, so that the work piece may be supported thereon, and upon the table t of the power saw S in relation to the saw 36; and suitable guides may be inserted in the grooves g on the saw table top t. However, for ripping wide boards or sheets of large dimensions (i. e. 4' x 8', more or less), the drop-leaf 37 will be raised to its horizontal position and supported by the leg 39 so as to give support to such sheet of material M (shown in dot-and-dash lines in Fig. 1) and which drop-leaf is designed to support a rip-gauge RG adjustable transversely thereof and against which gauge an edge of the work piece M will contact, in a manner understood in the art, so that the tool 36 will make the desired cut.

This rip-gauge RG comprises a holding bar 85 (see Figs. 1, 3, 13, 14, 15, 16, 17 and 18) that extends the length of the drop-leaf 37 and has at one end thereof a spaced underlying inwardly extending flange 86 to fit around and under an end edge of said drop-leaf and has at its other end a clamping means consisting of a pivoted latch member 87 having a recess or notch 88 therein that will receive and fit about the opposite end edge of the drop leaf 37. A cam lever 89 is pivoted also on the end of the holding bar 85 at a point outwardly beyond the latch 87 so that, when the cam lever 89 is swung in one position, it will allow the latch to be swung on its pivot to disengage the edge of the drop leaf, and, when the cam lever 89 is swung to another position, its cam surface 89a will engage the latch 87 and hold the same in locked engagement with said edge of the drop leaf 37 to bind the holding bar 85 in position. To assure accurate parallel alignment of the ends of the holding-bar 85 with the travel of the tool 36, the under-surface of the holding bar is provided with downwardly extending pins 90 at its opposite end portions to be selectively and fittedly received in a transversely extending series of aligned spaced openings 91 in opposite end portions of the upper surface of the drop-leaf 37, the openings 91 of each end portion of the drop leaf being aligned with a corresponding opening at the other end portion, so that the gauge RG may be generally adjusted to affect the approximate measurement of the cut to be taken by the tool 36. As many holes 91 may be provided in the drop-leaf 37 as may be found necessary or desirable for the purpose intended.

The holding bar 85 carries a gauge bar 92 which is co-extensive therewith and is disposed on the face of the holding bar 85 nearest the tool 36, the gauge bar 92 being supported from the holding bar 85 by lever arms 93 one positioned at opposite end portions of the holding bar to allow the gauge bar to be moved toward and from the holding bar for obtaining fine or accurate measurement. Each of the lever arms 93 extends through a slot 94 in the holding bar 85 and is pivoted thereto intermediate its ends, as at 95, with one end of the lever pivotally connected, as at 96, to the gauge bar 92, and with its other end having a portion 93a extending through an arcuate slot 97 in a quadrant 98 fastened to the holding bar 85. An edge of the quadrant slot 97 may be provided with a scale, if desired, and the end 93a of the lever is provided with a threaded hand-clamp 99 so that the adjusted position of the lever 93 may be clamped in its adjusted position.

The construction of the rip-gauge, therefore, allows the gauge bar 92 to be nicely adjusted in extended position from the holding bar 85 or allows the gauge bar 92 to be moved in a juxtaposition against the clamp bar. Also, it will be obvious that, should it be desired to take an oblique ripping cut in the material, the lever arms 93 may be adjusted to different angles for this purpose. Furthermore, the length of the arms 93 between its pivots 95 and 96 may be such as will allow full advantage to be taken of the gauge to bring the gauge bar 92 in close proximity to the tool 36, when the clamping bar 85 is in its closest adjustment to the tool 36.

As shown in the drawings, particularly Figs. 13 to 17 inclusive, the holding bar 85 may be a Z-shape metal bar and the clip 86 may also be Z-shaped of smaller dimensions welded to the end of the bar 85; and the gauge bar may be a metal channel bar of aluminum or other like metal. Suitable handles 100 may be provided on the upper ends of the pivots 95 and 96 to enable a convenient handling and manipulation of the gauge RG.

The work bench of this invention is also provided with a cross-cut gauge CG shown in Figs. 19, 20 and 21. As is the case with the rip-gauge RG, the cross-cut gauge CG is employed when the drop leaf 37 is in its horizontal position and consists of a holding bar 101 that is equipped at its inner end portion with a spaced under-lying clip or flange 102 on its under-surface which is adapted to hook or engage about the inner side edge of the top portion a of the upper side rail 31 of the bench. The holding bar 101 is designed to extend therefrom transversely across the drop-leaf 37 to a point short of the line of travel of the tool 36. The outer end of said cross-cut gauge CG is equipped with a latch member 103 which is the same as the latch member 87 of the ripping gauge RG and actuated by a similar clamp lever 104 so that the cross-cut gauge can be clamped in locked position transversely of the drop-leaf.

Also to assure accurate positioning of the holding bar 101, the under-side of the holding bar 101 is provided with downwardly extending pins 105 which engage in aligned openings or holes 106 in the drop-leaf 37 which will align the cross-cut gauge holding bar 101 normal to the movement of the tool 36.

As can be seen from Fig. 19, the inner end 101a of the cross-cut holding bar 101 extends about half-way across the area between the side rails 31 of the work bench and has a gauge-bar 107 pivoted to this inner end thereof as at 108, so that the gauge-bar 107 may be moved angularly with respect to the holding bar 101. This angular adjustment of the gauge bar 107 may be accomplished by a rod 109 pivotally connected at 110 to the gauge bar and passing through an opening 111 in the holding bar 101 and through a clamping device 112 for holding the rod 109 in adjusted position. The rod 109 may be provided also with a scale on its surface for giving degrees of angularity.

Thus, it is obvious that, for ordinary cross-cutting purposes, the gauge bar 107 may be moved in juxta-position against the holding bar 101 and an edge of the work-material to be cross-cut, may be placed thereagainst; and, upon actuation of the treadle 70, the tool 36 may be moved into the material to effect the cut. Should it be desired to take a diagonal cut, as indicated in Fig. 19, the gauge 107 may be suitably adjusted by actuation of the rod 109 to effect the degree of angularity, which adjustment will be maintained by the tightening of the clamp 112.

When making diagonal cross cuts, as illustrated in Fig. 19, the gauge should contact the entire edge and the adjustment corners of the material should be held against the pressure of the tool operating thereaginst. To this end, the gauge bar 107 carries—preferably at its upper edge in a tubular housing 107a—an extensible rod 113 deposed longitudinally of the gauge 107. This extensible rod 113 may be adjusted to positions beyond the inner end of the gauge bar 107 and held in adjusted positions by thumb screws 114. The outer extremities of the rod 113 carries a laterally extending projection 113a having a vertically adjustable inwardly extending flange 113b which forms a pocket for the corner of the material M' to be cut and with the flange 113b underlying the corner of said material so that, during the operation of the tool 36, said material-piece M' will not slip or slide out of position due to the angularity of the gauge 107 with respect to the direction of travel of the tool.

The opposite end of the gauge bar 107 may be provided with a slotted projection 115 which will extend through a complemental slot 115a in the holding bar 101, when the gauge bar is in juxta-position against the latter, and a pin or suitable wedge may be inserted in the slot of the projection 115 to hold the gauge bar in said juxta-position and when the rod 109 is folded in parallel relation with the holding bar 101 and out of engagement with its clamp 112.

To adapt hand saws to use with the bench of this invention, there is provided with the bench a table top t' (Figs. 22 and 23) which in all respects is substantially similar to the table top t which is part of the standard equipment of power driven table saws S. This table top t' may have applied directly thereto the axes 61 of the rollers 59a and 60a previously described and, for which purpose, the table t' is provided with downwardly depending side flanges t² having openings therein to receive the ends of the axles 61 in the same manner as do the brackets 62 previously described, thus eliminating the necessity for the bracket 62. The table top t' is provided with the usual slot t³ through which may extend the saw blade or other rotatable tool 36a of the so-called, hand tool S'. The hand tool S' is mounted to the underside of the table top t' by three bolts 116 which do not extend beyond the upper surface of the table top t' and which enable the saw S' to be readily attached and removed from the table top t'.

In some instances, it is advantageous to employ the rotatable saws or tools 36 or 36a while in a stationary position on the bench; and, to this end, the tool may be moved by the treadle 70 to the position desired on the bench where it may be chocked into stationary position by chocking blocks 117 removably attachable to the track 59 and disposed against opposite sides of its wheels 59a, as shown particularly in Figs. 24 and 25. The chocking blocks consist merely of rectangular blocks, or their equivalent, having a slot 118 into which the track flange portion of the track 59 is received and a hand set screw 119 threaded into one end of the block so as to impinge against the under-surface of the track and bind the block firmly in position. These blocks may also be employed for retaining the device S and S' in stationary position on the bench during shipment or transportation when desired.

From the above it will be manifest that the present invention provides an unique and improved mill bench for carpenters and other artisans which enables them to employ thereon power-tools, now on the market, after the manner of the mill and that the bench is exceedingly light and can be moved about from place to place as desired and can be constructed and provided at reasonable costs. The bench also affords a small portable mill for carpenters and the like which is safe to operate, which is speedily, efficient, accurate and time-saving and can be used by a single person without the need of assistants to perform a multitude of operations, and which can be collapsed to be moved from room to room and used relatively in small areas; that the operations that can be performed upon the mill are only limited by the interchangeability of the rotary tool elements that may be employed with the power-tools; that the mill-bench is particularly useful in cutting operations with materials of wide and long dimensions and which is not possible in many cases with the presently available power table and hand tools or without the requirement of helpers; that said mill-bench is durable and strong and that the drop leaf thereof may, in addition to the functions specifically described, form a convenient work-bench.

To those skilled in the art it will also be apparent that the traveling saw or tool 36 and 36a, operable by the foot pedal under the full control of the operator, allows such work to be done as rip-cutting, cross-cutting, diagonal cutting, mitering, compound mitering, dadoing, grooving, chamfering, and shaping; and that such operation may be performed efficiently upon plywood, Masonite, sheet rock and a large other variety of metals; and, by inserting different types of rotary tools, materials such as Transite, aluminum and sheet metals may be speedily cut. Also, by attaching an acetylene cutting torch to the top surface of the table t or t', sheet metals and boiler plates may be accurately cut without marking and in a safer and less dangerous manner of handling the torches.

Also, one or more power-driven drill presses may be positioned on the surfaces a of the upper side rails 31 to bore, ream or tap the workpiece; or a drill press may be mounted on the tables t or t' and move along the workpiece; or by providing the table t or t' with revolving tops upon which a drill press is mounted, a variety of operations may be performed on the workpiece by said drill press.

Having fully described the invention and the manner of performing the same and its advantages, it is to be understood that certain changes or variations may be made that fall within the spirit of the invention and that the invention is only to be limited by the scope of the terms of the appended claims.

That which is claimed, as new, is:

1. In a portable bench for reciprocably supporting automatic hand and table tools having an open area in its upper surface to form a guideway and extending longitudinally of the bench, tracks on the bench, one on each side of the guideway and extending longitudinally thereof, a roller supported bracket supported by each of said tracks and detachably connectible with a table element of an automatic power tool to be inserted in said guideway, the rollers of each bracket having an axle extending through the bracket, an interchangeable spacer sleeve surrounding the axle of each roller and interposed between the bracket and roller, and means for detachably fastening the end of the roller-axle to said bracket, whereby the distance between the roller and bracket may be varied to accommodate power-tools of different sizes.

2. In a portable bench, as set-forth in claim 1, wherein said bracket is substantially an inverted U with one leg having the axle secured thereto and the other leg adapted to be detachably secured to said table element.

3. In a portable bench for supporting automatic hand and table tools having an open guideway in its upper surface and extending longitudinally of the bench, carriage means mounted for reciprocal movement in and along said guideway for supporting an automatic power tool, means for reciprocating said tool including a vertical pull-lever pivoted at lower end to said bench and having a sheave at its free end, a sheave on the bench adjacent the path of movement of the free end of said pull-lever, a cable connected to said pull-lever and to carriage means and having its intermediate portions trained back-and-forth over said sheaves, a treadle mechanism to actuate said pull-lever and including a horizontally disposed treadle-lever pivoted at one end to the bench and having a pedal at its other end, an arcuate throw-lever opposite said pull-lever and having one end pivoted to said bench so that its convexed surface rides and bears against an intermediate portion of said pull-lever, and a link connecting said treadle-lever and said throw-lever at points intermediate their ends but nearer their pivot points.

4. In a portable bench for reciprocably supporting tools, means for reciprocating said tools and including a pull-lever pivoted at one end to said bench, a throw-lever pivoted at one end to said bench and arranged in relation to said pull-lever to have a side surface thereof to bear and ride against a side surface of said pull-lever to move the latter, a treadle-lever pivoted at one end of said bench and having a pedal at its other end, a link connecting said treadle-lever and said throw-lever at points intermediate their ends, and an operable connection between the free end of the pull-lever and said tools.

THEODORE L. DIRKSEN.

REFERENCES CITED

The following references are of record in the file of this patent:

UNITED STATES PATENTS

| Number | Name | Date |
|---|---|---|
| 272,734 | McDonald | Feb. 20, 1883 |
| 287,124 | Hamlet | Oct. 23, 1883 |
| 658,999 | Scannell | Oct. 2, 1900 |
| 934,949 | Trickey et al. | Sept. 21, 1909 |
| 1,756,527 | Thompson | Apr. 29, 1930 |
| 1,789,125 | Wildersen | Jan. 13, 1931 |
| 1,813,783 | Tomlinson | July 7, 1931 |
| 1,826,222 | Peterson | Oct. 6, 1931 |
| 1,864,840 | Lehner | June 28, 1932 |
| 1,930,168 | Hall | Oct. 10, 1933 |
| 2,010,882 | Ocenasek | Aug. 13, 1935 |
| 2,032,976 | Carter | Mar. 3, 1936 |
| 2,230,929 | Bray et al. | Feb. 4, 1941 |
| 2,505,658 | Wilson | Apr. 25, 1950 |
| 2,515,008 | Humphrey | July 11, 1950 |

FOREIGN PATENTS

| Number | Country | Date |
|---|---|---|
| 120,047 | Switzerland | May 2, 1927 |